United States Patent [19]

Adams et al.

[11] 4,424,250

[45] Jan. 3, 1984

[54] CARPET FACED TEXTILE PANEL

[75] Inventors: Ronald W. Adams, Auburn, Me.; Kathryn A. Middleton, Concord, N.C.

[73] Assignee: Albany International Corp., Albany, N.Y.

[21] Appl. No.: 370,603

[22] Filed: Apr. 21, 1982

[51] Int. Cl.³ .............................................. B32B 3/00
[52] U.S. Cl. .................................... 428/198; 428/95; 428/212; 428/288; 428/296; 428/300; 428/301
[58] Field of Search ............... 428/198, 212, 296, 300, 428/301, 95, 288

[56] References Cited

U.S. PATENT DOCUMENTS 4,199,635  4/1980  Parker .................................. 428/300

Primary Examiner—Marion McCamish
Attorney, Agent, or Firm—Kane, Dalsimer, Kane, Sullivan and Kurucz

[57] ABSTRACT

The disclosure is of decorative textile panels, and in particular carpet faced decorative textile panels which are useful as interior upholstery panels.

5 Claims, 7 Drawing Figures

CARPET FACED TEXTILE PANEL

BACKGROUND OF THE INVENTION

1. Field of the Invention

The invention relates to decorative textile panels and more particularly relates to carpet-faced decorative textile panels useful as interior upholstery.

2. Brief Description of the Prior Art

The prior art literature is replete with descriptions of textile panels useful in upholstering interior spaces such as the interior of automobiles. Representative of prior art descriptions are those found in U.S. Pat. Nos. 3,307,990; 3,562,052; 3,649,429; 4,100,323; 4,199,635; 4,205,113; 4,258,093; and 4,258,094.

In general, prior art decorative textile panels are made up of a multiplicity of diverse materials, often laminated together. As such, there are disadvantages associated with their production and use. First, a large inventory of the diverse materials must be maintained at the site of manufacture. Maintenance of any large inventory of diverse material is a capital expense, desirably held to a minimum. The panels of the present invention may be fabricated from as few as two diverse textile materials. Adhesives are not required. Lacking separate adhesive components there is also eliminated any outgassing problems frequently encountered with prior art laminate panels; i.e.; volatilization of volatile compounds associated with certain polymeric resins and adhesives, followed by their condensation on interior surfaces of the reupholstered space.

Further, the decorative panels of the invention are unitary, homogeneous and mono-layered. Since they are not laminates, they are not subject to delamination as are the laminate panels of the prior art. The panels of the invention are highly flexible and easily installed in interior spaces.

SUMMARY OF THE INVENTION

The invention comprises a unitary, mono-layered, non-woven, carpet-faced, decorative textile panel, which comprises;

a base of non-woven, first and second thermoplastic resin textile fibers, said first fibers having a lower temperature softening point than the second fibers;

a face of the first fibers;

portions of said base and face fibers being interengaged with each other, the interengagement being of the character associated with needled fibers;

the first fibers in the base having the character of heat-softened and re-hardened fibers, interlocked by rehardening while in contact with each other and with said second fibers; said second fibers lacking said character; and the first fibers and portions of first fibers in the face being free of interlocking as described above.

The panels of the invention are useful as decorative upholstery panels.

DETAILED DESCRIPTION OF THE PREFERRED EMBODIMENTS OF THE INVENTION

Figure 1:
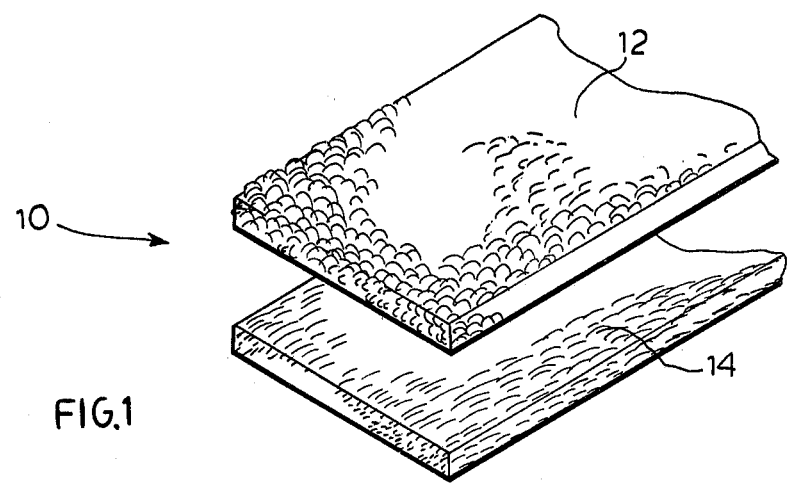
FIG. 1 is an enlarged view-in-perspective of a portion of an embodiment panel of the invention, separated to show the face and the base (which are actually unitary and integrated).

FIG. 1 is an enlarged view-in-perspective of a portion of an embodiment panel 10 of the invention, separated to show a face 12 and a base 14. In actuality the face 12 and base 14 are structurally integrated and such a separation is not possible without a complete destruction of the panel 10.

Figure 2:
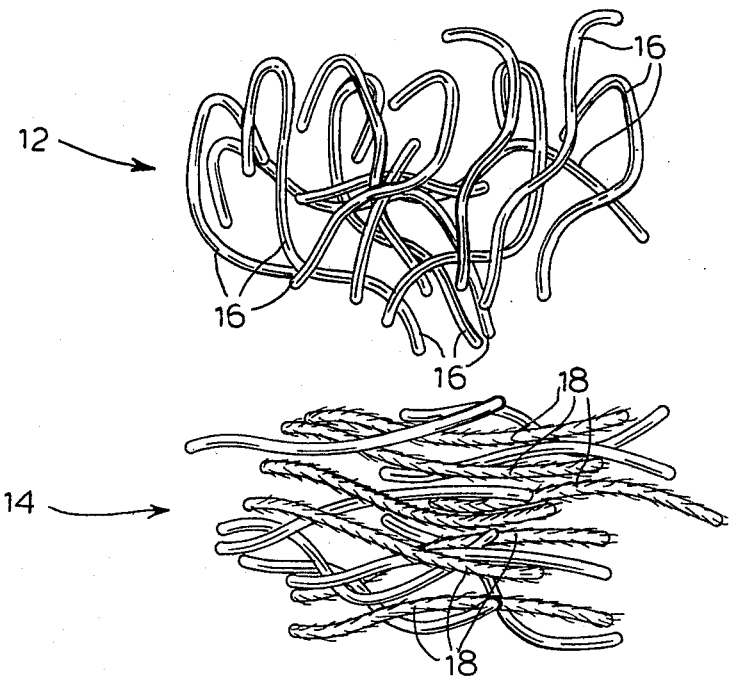
FIG. 2 is a greatly enlarged view of the face and the base shown in FIG. 1, showing their composition.

FIG. 2 is a greatly enlarged view of a portion of the face 12 and the base 14 shown in FIG. 1. In the preferred panel 10, the face 12 is made up of synthetic, thermoplastic textile fibers 16 such as fibers of a thermoplastic resin. Representative of the fibers 16 are fibers of polyethylene, polyester, polypropylene and polyamide such as Nylon 6 (the polyamide condensation product of adipic acid and hexamethylenediamine). Most preferred, the fibers 16 are polypropylene or polyester fibers which in a non-woven batt have been processed through a Dilo machine to give the batt an appearance of a tufted carpeting. The base 14, as shown in FIG. 2 is made up of a blend of the same fibers 16 described above and textile staple fibers 18 which are characterized in part by their having a softening point temperature substantially above that associated with the fibers 16. Representative of the fibers 18 are fibers of polypropylene, polyester, polyamide such as Nylon 6,6 (the polyamide condensation product of adipic acid and caprolactam) and like polymeric resin. Most preferred are polyester fibers. Although a wide variety of combinations of fibers 16 and fibers 18 may be employed, we particularly prefer the following combinations:

| | SURFACE FIBERS 16 | MELT TEMP. °F. | BASE FIBERS 16/18 | MELT* TEMP. °F. |
|---|---|---|---|---|
| 1 | Polyethylene | 230-250 | Polyethylene/propylene | 320-350 |
| 2 | Polypropylene | 320-350 | Polypropylene/polyester | 440-460 |
| 3 | Polyester | 440-490 | Polyester/polyamide (Nylon 6,6) | 480-500 |
| 4 | Polyamide (Nylon 6) | 419-430 | Polyamide (Nylon 6) (Nylon 6,6) | 480-500 |

*of fibers 18

The ratio of fibers 16 to fibers 18 may be within the range of from about 4:1 to 1:4 preferably 1:1 on a weight basis.

Figure 3:
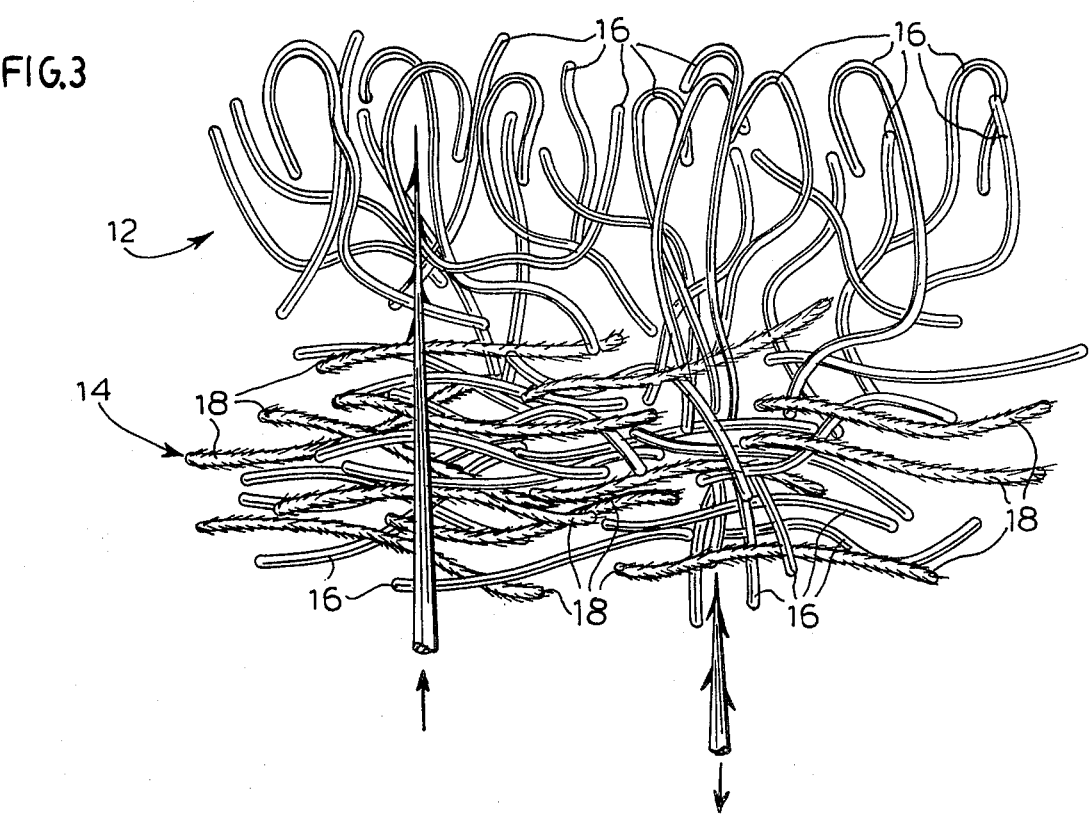
FIG. 3 is a view as in FIG. 2, but showing the integration of the face and the base by needling.

As mentioned above, the face 12 and the base 14 are actually integrated into a single, monolayered fabric panel 10. Integration of the face 12 and the base 14 fibers is achieved by needling and by thermoforming under heat and pressure. As shown in FIG. 3, needling of the face 12 and base 14 from the base 14 side vertically orients some of the fibers 16, 18 and entangles the fibers 16, 18 so that they interengage and consolidate non-woven webs of the fibers. More particularly, a non-woven web of Dilo machine textured fibers 16 as a face 12 is secured by needling to a non-woven web of a 50/50 blend of textile fibers 16, 18 forming a base 14. The technique of needling is well-known to those skilled in the art and details need not be recited herein; see for example the description of needling techniques given in U.S. Pat. No. 2,059,132.

Figure 4:
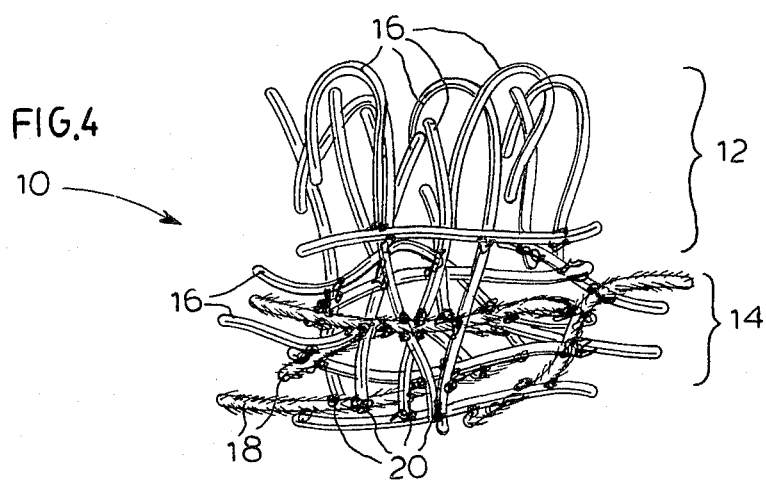
FIG. 4 is an enlarged side view of a portion of the embodiment panel of FIG. 1, showing details of the fibrous structure.

Following needling of the non-woven fibrous mass as described above, the needled fabric is thermoformed under pressure and at a temperature sufficient to heat-soften the fibers 16 or portions thereof in the base 14. Under these conditions, the heat-softened fibers 16 will fuse with or conform to the shape of adjacent fibers 16, 18 at contact points. UPon subsequently cooling, the heat-softened fibers will reharden and interlock with the adjacent fibers 16, 18 at contact points 20, thereby rigidifying and stabilizing the panel 10. This structure is shown in FIG. 4, an enlarged side view of a portion of the embodiment panel 10 as finished. The heat-softened and rehardened-upon-cooling fibers 16 interlock with other fibers 16 and fibers 18 at contact points 20 in the base 14. However, in the face 12, the fibers 16 are noticeable in that interlocking of fibers has not taken place. The fibers 16 in the face 12 remain free of interlocking under heat and pressure and therefore retain their character as a quasi tufted carpeting. The fibers 16 in the face 12 are not exposed to temperatures approaching their softening points, although the same fibers 16 in the base 14 are in fact heat softened. The difference is achieved prior to thermoforming by maintaining the face 12 fibers 16 at a temperature below the fiber softening point while the base 14 fibers 16 are heated to the softening point. Those skilled in the art of thermoforming thermoplastic textiles will appreciate the technique of maintaining different temperature exposures on different sides of the same fibric. We have found that shielding the face 12 during heating with a heat shielding fabric shield such as a fabric of a high-temperature resistant material is an advantageous technique. Thus, the face 12 of the panel 10 may be shielded with a Nomex fabric to prevent heat softening of the fibers 16 in the face 12.

Figure 5:
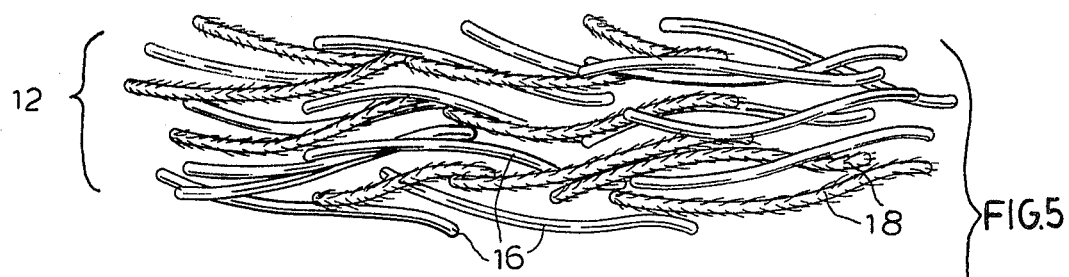
FIGS. 5 and 6 show stages in the fabricator of another embodiment panel of the invention.
Figure 6:
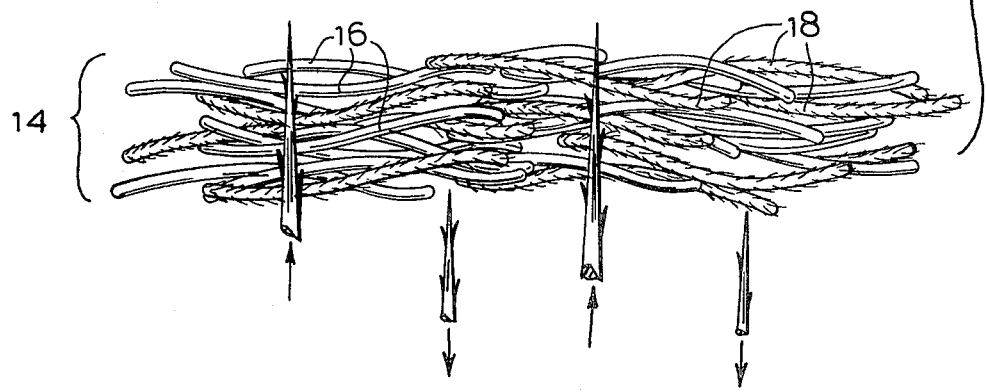
Figure 7:
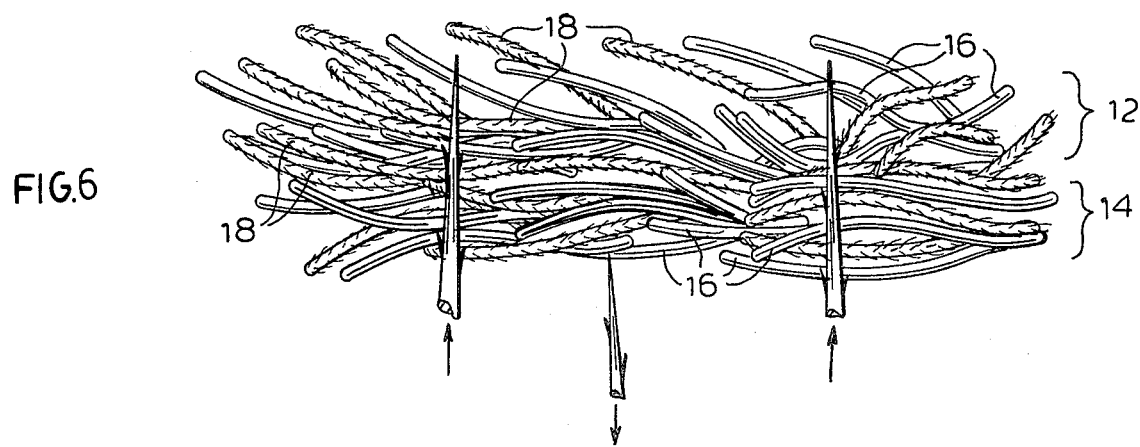
FIG. 7 shows an enlarged side view of a portion of the embodiment panel prepared as shown in FIGS. 5 and 6.

Those skilled in the art will appreciate that many modifications of the above described preferred embodiment panel 10 may be made without departing from the spirit and the scope of the invention. For example, as shown in FIG. 5, the base 14 of the panel 10 may be pre-needled prior to the needling of the base 14 to the face 12 web of fibers 16. This consolidates and densifies the base 14 so that a firm, rigid backing is obtained in the panel 10. In FIG. 6, there is shown the needling then of the pre-needled base 14 to the face 12 fibers 16. FIG. 7 is a cross-sectional, side view of a portion of the fabric shown in FIGS. 5 and 6, after thermoforming to interlock fibers 16 and 18 in the base 14 while fibers 16 in face 12 remain free of interlocking but engaged through needling with the base 14. This structure of FIG. 7 has a firm, rigid base 14 as a backing for the panel 10.

The following examples set forth the manner and process of making and using the invention and set forth the best mode contemplated by the inventors of carrying out the invention but are not to be construed as limiting.

EXAMPLE 1

A 24 oz/sq. yd. batt with a density of 0.20 grams/cc made from a blend of 50% propylene textile fibers and 50% polyester textile fibers is provided. To this batt there is needled an automobile Dilo processed polypropylene carpet (ranging from 8 to 16 oz./sq. yd. weight). The carpet layer fibers are mechanically locked into the fibers of the batting by needling from the back of the batt. The resulting needled fabric is heated from the back (non-carpet side) to a temperature of 390° F. wherein the polypropylene fibers in the backing are heat softened but the polyester fibers remain in a fibrous state. The carpet side is covered with a Nomex fabric shield to insulate the surface fibers. While the heated fabric is hot, it is placed into a plug assist type of thermoformer with the carpet side up and the mold closed. Molding takes place before the polypropylene cools, thus allowing the fabric to be stretched and shaped. The molded fabric is then allowed to cool before being demolded. When cooled, it is observed that the polypropylene fibers in the back side have interlocked together with the polyester fibers within the back side of the finished fabric while the carpeted face polypropylene are free and only anchored by the needling process. The molded part may be die cut with a contour die to any desired shape and configuration. Fastener retainers may be ultrasonically welded at desired points, to prepare the molded fabric for installation as upholstery in the interior of, for example, an automobile.

It will be appreciated by those skilled in the art that the molded part described above is relatively free of synthetic polymeric resins or adhesives which would cause outgassing problems.

EXAMPLE 2

The procedure of Example 1, supra, is repeated except that the Dilo machine process carpeting is replaced with a batt of non-woven polypropylene textile fibers (12 oz./sq. yd.) and the backing non-woven batt of polypropylene mixed with polyester fibers is pre-needled to densify this batt. The resulting thermoformed, molded article is useful as an interior upholstery panel, particularly to upholster the trunk of an automobile.

EXAMPLE 3

A 24 oz/sq. yd. batt with a density of 0.20 grams/cc made from a blend of 50% polyamide textile fibers such as Nylon 6,6 and 50% polyester textile fibers is provided. To this batt there is needled an automotive Dilo processed polyester carpet (ranging from 8 to 16 oz./sq. yd. weight). The carpet layer fibers are mechanically locked into the fibers of the batting by needling from the back of the batt. The resulting needled fabric is heated from the back (non-carpet side) to a temperature of 390° F. wherein the polyester fibers in the backing are heat softened but the polyamide fibers remain in a fibrous state. The carpet side is covered with a Nomex fabric shield to insulate the surface fibers. While the heated fabric is hot, it is placed into a plug assist type of thermoformer with the carpet side up and the mold closed. Molding takes place before the polyester cools, thus allowing the fabric to be stretched and shaped. The molded fabric is then allowed to cool before being demolded. When cooled, it is observed that the polyamide fibers in the back side have interlocked together with the polyester fibers within the back side of the finished fabric while the carpeted face polyester is free and only anchored by the needling process. The molded part may be die cut with a contour die to any desired shape and configuration. Fastener retainers may be ultrasonically welded at desired points, to prepare the molded fabric for installation as upholstery in the interior of, for example, an automobile.

It will be appreciated by those skilled in the art that the molded part described above is relatively free of synthetic polymeric resins or adhesives which would cause outgassing problems.

EXAMPLE 4

The procedure of Example 1, supra, is repeated except that the Dilo machine process carpeting is replaced with a batt of non-woven polyester textile fibers (12 oz/sq. yd.) and the backing non-woven batt of polyester mixed with polyamide such as Nylon 66 fibers is pre-needled to densify this batt. The resulting thermoformed, molded article is useful as an interior upholstery panel, particularly to upholster the trunk of an automobile.

The articles prepared in the foregoing Examples 1-4, inclusive, upon testing are found to exceed the minimum requirements of the Federal Motor Vehicle Safety Standard 302 (non-flammability) and to resist separation of the face fibers from the base fibers when tested on an Instron machine (1 inch width specimen resists fiber pull-out under a 1 lb. force).

Those skilled in the art will appreciate that many modifications may be made to the above described preferred embodiment of the invention without departing from the spirit and scope of the invention. For example, by selection of fiber colors in the facings and backings of the fabrics employed to thermoform the desired molded articles, one can avoid die cut edges of the molded parts which appear dissimilar.

What is claimed is:

1. A unitary, monolayered, nonwoven, carpet faced, decorative textile panel, which comprises;
   a base of non-woven, first and second thermoplastic resin textile fibers, said first fibers having a lower temperature softening point than the second fibers;
   a face of the first fibers;
   portions of said base and face fibers being interengaged with each other, the interengagement being of a character associated with needled fibers;
   the first fibers in the base having the character of heat-softened and re-hardened fibers, interlocked by rehardening while in contact with each other and with said second fibers; said second fibers being textile staple fibers lacking said character; and
   the first fibers and portions of first fibers in the face being free of interlocking as described above.

2. The panel of claim 1 wherein the first fibers are fibers of polyethylene and the second fibers are fibers of polypropylene.

3. The panel of claim 1 wherein the first fibers are fibers of polypropylene and the second fibers are fibers of a polyester.

4. The panel of claim 1 wherein the first fibers are fibers of a polyester and the second fibers are fibers of a polyamide.

5. The panel of claim 1 wherein the first fibers are fibers of a polyamide condensation product of adipic acid and hexamethylenediamine and the second fibers are fibers of a polyamide condensation product of adipic acid and caprolactam.

* * * * *